(12) United States Patent
Niitsuma

(10) Patent No.: US 7,616,334 B2
(45) Date of Patent: Nov. 10, 2009

(54) IMAGE PRINTING SYSTEM

(75) Inventor: Tetsuya Niitsuma, Tokyo (JP)

(73) Assignee: Konica Minolta Holdings, Inc. (JP)

( * ) Notice: Subject to any disclaimer, the term of this patent is extended or adjusted under 35 U.S.C. 154(b) by 936 days.

(21) Appl. No.: 10/801,558

(22) Filed: Mar. 17, 2004

(65) Prior Publication Data

US 2004/0184098 A1 Sep. 23, 2004

(30) Foreign Application Priority Data

Mar. 19, 2003 (JP) ............................. 2003-075008

(51) Int. Cl.
G06K 15/00 (2006.01)
G06F 3/12 (2006.01)
G06F 15/16 (2006.01)
H04N 1/00 (2006.01)

(52) U.S. Cl. .................... 358/1.15; 358/1.13; 358/1.14; 358/1.16; 358/1.1; 358/403; 358/401; 709/201; 709/202; 709/203

(58) Field of Classification Search ....... 358/1.13–1.18, 358/400–404; 709/100–107, 238, 232, 219, 709/201–207; 707/3, 200, 205
See application file for complete search history.

(56) References Cited

U.S. PATENT DOCUMENTS 5,854,693 A * 12/1998 Yoshiura et al. ............. 358/468
6,791,703 B1 * 9/2004 Maeda et al. ............... 358/1.15
6,804,020 B1 * 10/2004 Kuroda ...................... 358/1.15
7,265,859 B2 * 9/2007 Sato .......................... 358/1.15
2001/0050782 A1 * 12/2001 Niitsuma et al. ........... 358/1.15
2002/0109860 A1 * 8/2002 Niitsuma .................... 358/1.15
2002/0171864 A1 * 11/2002 Sesek ........................ 358/1.15

FOREIGN PATENT DOCUMENTS

| JP | 09-272246 | 10/1997 |
|----|-----------|---------|
| JP | 10-190930 | 7/1998 |
| JP | 2001-333237 | 11/2001 |
| JP | 2003-076529 A | 3/2003 |

* cited by examiner

Primary Examiner—Twyler L Haskins
Assistant Examiner—Chad Dickerson
(74) Attorney, Agent, or Firm—Finnegan, Henderson, Farabow, Garrett & Dunner, L.L.P.

(57) ABSTRACT

This invention provides an image printing system formed by connecting an image printing apparatus to an information processing apparatus through a network. In the image printing system of this invention, in order to manage and limit even output processing externally input to the image printing apparatus through the network, when the image printing apparatus receives image data subjected to output processing requested by another image printing apparatus, control is performed to permit or inhibit image printing on the basis of a limitation on output operation which is set on the assumption of this situation.

20 Claims, 4 Drawing Sheets

IMAGE PRINTING SYSTEM

BACKGROUND OF THE INVENTION

1. Field of the Invention

The present invention relates to an image printing system and, more particularly, to an image printing system formed by connecting an image printing apparatus to an information processing apparatus through a network.

2. Description of the Prior Art

An image printing apparatus such as a digital copying machine has been known well, which has an image reading unit which reads an image from an original on which an image is recorded and outputs it as image data and an image printing unit which prints an image on a sheet or the like on the basis of image data.

In such an image printing apparatus, for example, simple image processing such as trimming is performed for the image data read by the image reading unit, and the image printing unit can perform image printing on the basis of the image data having undergone the image processing.

An image printing system used in a network environment has been provided.

Such an image printing system is formed by connecting, for example, an image printing apparatus such as a digital copying machine to an information processing apparatus such as a personal computer or workstation, which instructs the image printing apparatus to scan (read) and print an image, through a network. This system may have an arrangement in which a plurality of image printing apparatuses and a plurality of information processing apparatuses are connected to a network.

The use of such an image printing system in the scanner mode is known, in which, for example, an information processing apparatus instructs an image printing apparatus to read an image, and the image printing apparatus transfers the read image to the information processing apparatus.

In a conventional image printing system, for example, the image data of the image read by an image printing apparatus in the scanner mode is transferred to an information processing apparatus, and the information processing apparatus which has received the image data can store the image data as an image file in a hard disk without any change or transfer the image file to the image printing apparatus to print an image, as needed.

Japanese Unexamined Patent Publication No. 2001-333237 discloses an image printing system which can perform various kinds of image processing for image data in an image printing apparatus or perform image processing for image data in an information processing apparatus upon transferring the image data to the information processing apparatus through a network.

As a conventional image printing apparatus, an apparatus having a control unit called an EKC (Electric Key Counter (output permission management system for each user)) is known, which authenticates a user as an operator with a password or the like by using the EKC, and can manage the maximum number of prints which can be output for each user and the like, thereby managing the number of prints which can be used for each user and facilitating running cost management (see Japanese Unexamined Patent Publication No. 2003-76529).

The following problem, however, arises in the conventional image printing system.

A conventional image printing apparatus has performed management using the above EKC. This management technique allows only limitation and management of output processing by a user when the user is authenticated in the image printing apparatus. However, there is no consideration given to external requests for output processing which are input to an image printing apparatus through a network in an image printing system in a network environment like that disclosed in Japanese Unexamined Patent Publication No. 2001-333237.

In an image printing apparatus in the conventional image printing system, therefore, satisfactory limitation and management of output processing cannot be realized.

SUMMARY OF THE INVENTION

The present invention has been made in consideration of the above problems in the prior art, and has as its object to provide an image printing system which manage and limit even output processing externally input to an image printing apparatus through a network.

In order to achieve the above object, according to the first aspect of the present invention, there is provided an image printing system formed by connecting, through a network, a plurality of image printing apparatuses, each having an image reading unit which reads an image from an original to obtain image data, an image printing unit which prints an image on a sheet on the basis of the image data, and a first image processing unit which performs image processing for the image data, and an information processing apparatus having a second image processing unit which performs image processing for the image data, wherein the image printing apparatus further comprises an apparatus ID storage unit which stores an apparatus ID which specifies the image printing apparatus, and a first image data transmission unit which transmits, to the information processing apparatus, image data to be output, an apparatus ID stored in the apparatus ID storage unit, and a transfer destination address which is an address of a remote image printing apparatus to which the image data is to be transferred, the information processing apparatus further comprises a first image data reception unit which receives image data, an apparatus ID, and a transfer destination address from the first image data transmission unit, and a second image data transmission unit which transmits the image data received by the first image data reception unit and the apparatus ID to the transfer destination address received by the first image data reception unit, and the image printing apparatus further comprises an external data output limitation setting unit which sets a limitation associated with image printing of image data which is transferred from an apparatus as a transfer source other than the image printing apparatus, a second image data reception unit which receives image data and an apparatus ID from the second image data transmission unit in the information processing apparatus, and a control unit which determines whether or not the apparatus ID received by the second image data reception unit coincides with an apparatus ID stored in the apparatus ID storage unit, and when the apparatus IDs do not coincide with each other, causing the image printing unit to print an image based on the image data received by the second image data reception unit on the basis of a limitation set by the external data output limitation setting unit.

According to the second aspect of the present invention, there is provided an image printing system wherein the external data output limitation setting unit described in the first aspect can set at least two kinds of settings including "always permitting output operation" and "always inhibiting output operation".

According to the third aspect of the present invention, there is provided an image printing system wherein the external data output limitation setting unit described in the first or second aspect comprises a limit value setting unit which can set at least "limit addition" and sets a limit value of the "limit addition", and the control unit permits output operation until an output print count reaches the limit value set by the limit value setting unit, and inhibits output operation when the output print count reaches the limit value.

According to the fourth aspect of the present invention, there is provided wherein the image printing apparatus described in any one of the first to third aspects further comprises a user authentication unit which authenticates a user as an operator and an user-specific output limitation setting unit which sets an output limitation for each user, the first image data transmission unit transmits to the information processing apparatus, also user information of a user who has operated output operation for image data transmitted by the first image data transmission unit, the first image data reception unit also receives the user information from the first image data transmission unit, the second image data transmission unit also transmits the user information received by the first image data reception unit to the transfer destination address received by the first image data reception unit, the second image data reception unit receives the user information from the second image data transmission unit, and the control unit determines whether or not the apparatus ID received by the second image data reception unit coincides with an apparatus ID stored in the apparatus ID storage unit, and when the apparatus IDs coincide with each other, performs control to make the image printing unit print an image based on the image data received by the second image data reception unit on the basis of the limitation set by the user-specific output limitation setting unit.

According to the fifth aspect of the present invention, there is provided an image printing apparatus wherein the control performed by the control unit descried in the fourth aspect with respect to an output limitation when the apparatus ID received by the second image data reception unit coincides with the apparatus ID stored in the apparatus ID storage unit is the same as control on an output limitation which is performed when an image based on image data is to be printed in the image printing apparatus without the mediacy of the information processing unit.

According to the sixth aspect of the present invention, there is provided an image printing system wherein when the control unit described in any one of the first to fifth aspects rejects image printing based on the image data received by the second image data reception unit, the control unit notifies a user who has operated output operation for the image data of corresponding information.

According to the seventh aspect of the present invention, there is provided an image printing system wherein when the control unit described in any one of the first to sixth aspects rejects image printing based on the image data received by the second image data reception unit, the control unit notifies an administrator of corresponding information.

According to the eighth aspect of the present invention, there is provided an image printing system wherein the control unit described in the sixth or seventh aspect performs the notification by e-mail.

According to the ninth aspect of the present invention, there is provided an image printing system wherein when the control unit described in any one of the first to eighth aspects rejects image printing based on the image data received by the second image data reception unit, the control unit notifies an image printing apparatus as a transmission source of the image data of corresponding information, and the image printing apparatus further comprises a display unit which displays information indicating reception of the notification.

As is obvious from the respective aspects described above, according to the present invention, there is provided an image printing system which can manage and limit even output processing externally input to an image printing apparatus through a network.

According to the present invention, even when data is received from an external processing apparatus, proper output control can be performed.

According to the present invention, in an image printing apparatus, output control settings can be properly made with respect to data transferred from another apparatus.

According to the present invention, since an output print count can be limited in output limitation, output control settings for data transferred from another apparatus can be made more flexibly.

In addition, the present invention can properly cope with a case wherein a transfer source is a self-apparatus, and the data is sent from an external processing apparatus. In this case, flexible output control can be performed for each user.

According to the present invention, settings to be made in output control when copying operation is to be done without the mediacy of an image processing server can be made equal to those in output control when output operation is to be performed through the image processing server. This makes it easy for the user to perform output control without confusing.

According to the present invention, when output operation is rejected, the user or administrator can be notified of the corresponding information. This makes it possible to provide an image printing system with higher operability.

In addition, according to the present invention, since information indicating the rejection of output operation can be notified by e-mail, flexible notification can be realized.

Furthermore, according to the present invention, since information indicating the rejection of output operation can be displayed on the display unit of an image printing apparatus, an image printing system with higher operability can be provided.

The above and many other objects, features and advantages of the present invention will become manifest to those skilled in the art upon making reference to the following detailed description and accompanying drawings in which a preferred embodiment incorporating the principle of the present invention is shown by way of illustrative examples.

DETAILED DESCRIPTION OF THE PREFERRED EMBODIMENT

A preferred embodiment of the present invention will be described below with reference to the accompanying drawings.

The arrangement and basic operation of an image printing system according to this embodiment will be described first with reference to FIG. 1.

In this embodiment, an electrophotographic digital copying machine will be exemplified as an image printing apparatus, and a PC server will be exemplified as an information processing apparatus.

Figure 1:
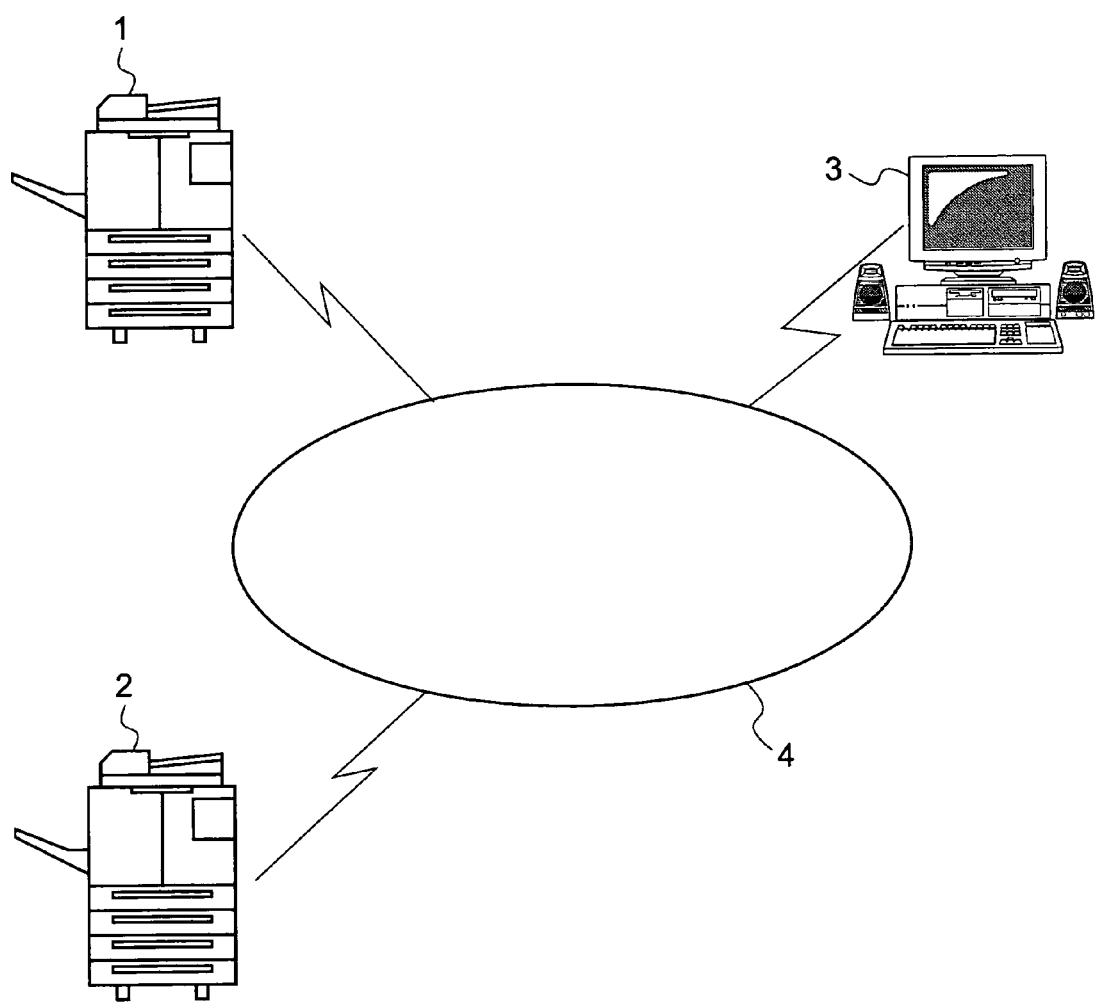
FIG. 1 is a block diagram showing a schematic system arrangement associated with an embodiment of the image printing system of the present invention.

As shown in FIG. 1, in the image printing system of this embodiment, digital copying machines 1 and 2 and a PC server 3 are connected to each other through a network 4.

Each of the digital copying machines 1 and 2 can independently read (scan) an original and print an image. In addition, when, for example, the digital copying machine 1 is connected to the network 4, the image read by the digital copying machine 1 can be transferred to the digital copying machine 2 to make the digital copying machine 2 print an image, and vice versa. That is, the image read by the digital copying machine 1 or 2 can be transferred to another apparatus through the network 4, or the image received from another apparatus through the network 4 can be printed by using the digital copying machine 1 or 2.

In this embodiment, the PC server 3 is also connected to the network 4. The PC server 3 can perform predetermined image processing for the image data received from the digital copying machines 1 and 2 and return the resultant data to the transmission sources. Alternatively, for example, the PC server 3 may perform predetermined image processing for the image data received from the digital copying machine 1 and transfer the resultant data to the digital copying machine 2 different from the transmission source.

Referring to FIG. 1, the network 4 can be any kind of network, e.g., Ethernet (registered trademark), a LAN such as token ring, or the Internet. Addresses on the network (e.g., IP addresses) have already been set for the respective apparatuses connected to the network 4. Each apparatus is identified by such an address and communicates with other apparatuses connected to the network 4. As this communication medium, so-called e-mail may be used. Furthermore, a medium using the ftp protocol, HTTP protocol, or the like may be used.

Referring to FIG. 1, a PC server as an image processing server which is an information processing apparatus and digital copying machines, i.e., image printing apparatuses, are in a one-to-two relationship. Obviously, however, these apparatuses may have a one-to-many relationship or many-to-many relationship.

Figure 2:
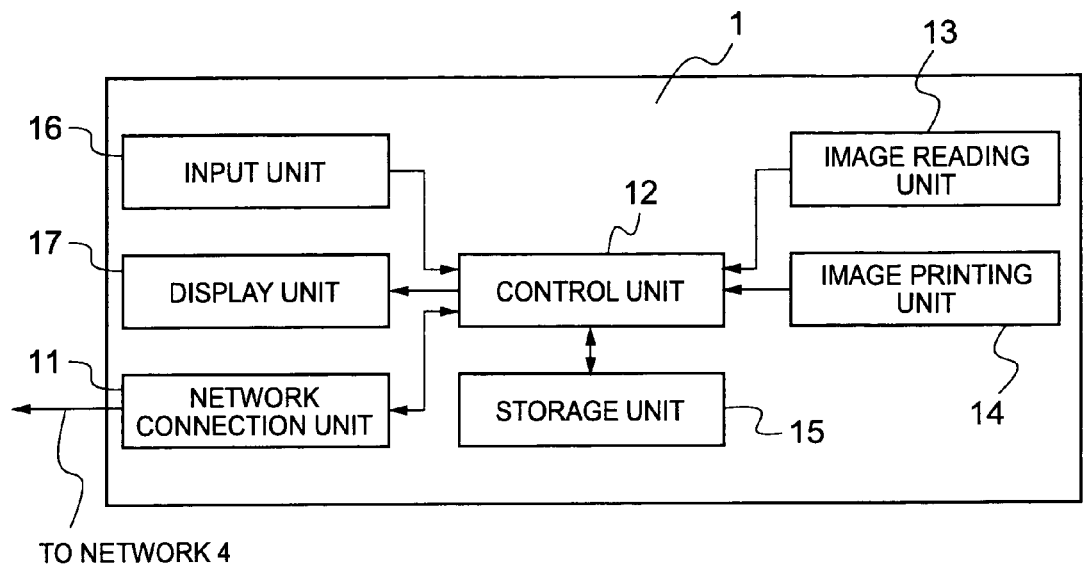
FIG. 2 is a block diagram showing the schematic arrangement of a digital copying machine shown in FIG. 1.

FIG. 2 is block diagram showing the arrangement of the digital copying machine 1 shown in FIG. 1.

Since the digital copying machines 1 and 2 shown in FIG. 1 have the same basic arrangement according to this embodiment, only the digital copying machine 1 will be described here.

The digital copying machine 1 includes a network connection unit 11 serving as an interface with the network 4 in FIG. 1, a control unit 12 which controls the overall operation of the digital copying machine 1 (including EKC control and various kinds of control to be described later), an image reading unit 13 which reads an image from an original, an image printing unit 14 which prints an image on a sheet or the like, a storage unit 15 which stores the image data read by the image reading unit 13, parameters and software programs (including an EKC control program operating on the control unit 12 and various kinds of control programs to be described later) necessary for the operation of the digital copying machine 1, software programs for image processing to be performed for image data inside the digital copying machine 1, a user registration database (including combinations of user IDs and passwords) used for user authentication, an output limitation setting for each user which is used for EKC control, and the like, an input unit 16 by which a user inputs operation instructions and the like to the digital copying machine 1, and a display unit 17 which displays various kinds of information to a user.

Note that the input unit 16 and display unit 17 may be integrated into an operation window such as a touch panel. This embodiment exemplifies the digital copying machine 1 having this integrated operation window.

Figure 3:
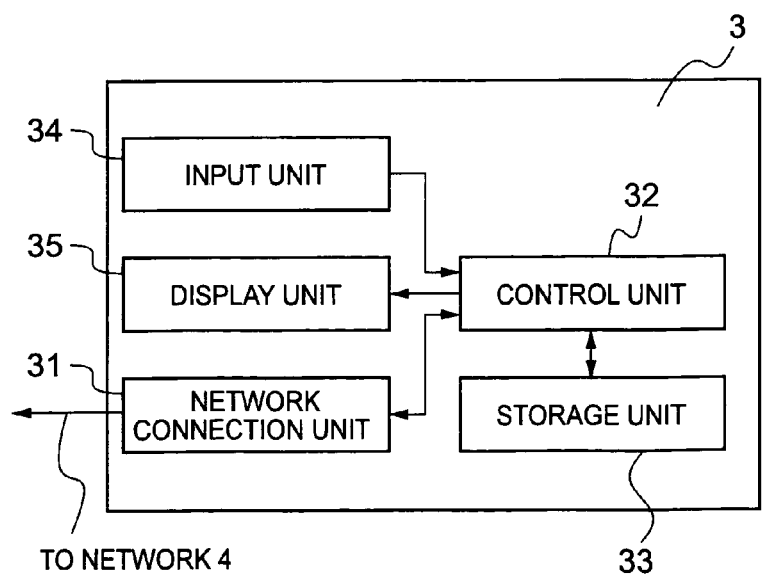
FIG. 3 is a block diagram showing the schematic arrangement of a PC server shown in FIG. 1.

FIG. 3 is a block diagram showing the schematic arrangement of the PC server 3 shown in FIG. 1.

The PC server 3 includes a network connection unit 31 serving as an interface with the network 4 in FIG. 1, a control unit 32 which controls the overall operation of the PC server 3, a storage unit 33 which stores parameters and software programs necessary for the operation of the PC server 3, software programs for image processing performed for image data in the PC server 3, and the like, an input unit 34 by which the operator of the PC server 3 inputs operation instructions and the like to the PC server 3, and a display unit 35 which displays various kinds of information to the operator of the PC server 3.

The operation of this embodiment will be described next.

When the user is to operate the digital copying machine 1, user authentication is performed in the operation window constituted by the input unit 16 and display unit 17 of the digital copying machine 1.

In this user authentication, for example, the user is made to input a user ID and password through the operation window of the digital copying machine 1. The control unit 12 of the digital copying machine 1 then refers to the combinations of user IDs and passwords registered in the storage unit 15 in advance to check whether or not the same combination as that input by the user is registered in the storage unit 15. If no such combination is registered in the storage unit 15, the control unit 12 performs corresponding processing, e.g., prompting the user to input a user ID and password again or inhibiting the use of the digital copying machine 1.

If the same user ID and password as those input by the user are registered in the storage unit 15, the control unit 12 provides the function of the digital copying machine 1 for the user afterward.

Note that user authentication is not limited to the above input operation for a user ID and password. For example, the user may carry portable terminal equipment, an IC card, a magnetic card, or the like in which a user ID is stored in advance, and may make the digital copying machine 1 read it, thus inputting the user ID. Obviously, the digital copying machine 1 or PC server 3 may read a user ID by using a direct contact type device such as a magnetic card reader or by means of wired or wireless (e.g., IrDA or Bluetooth specification) communication.

Figure 4:
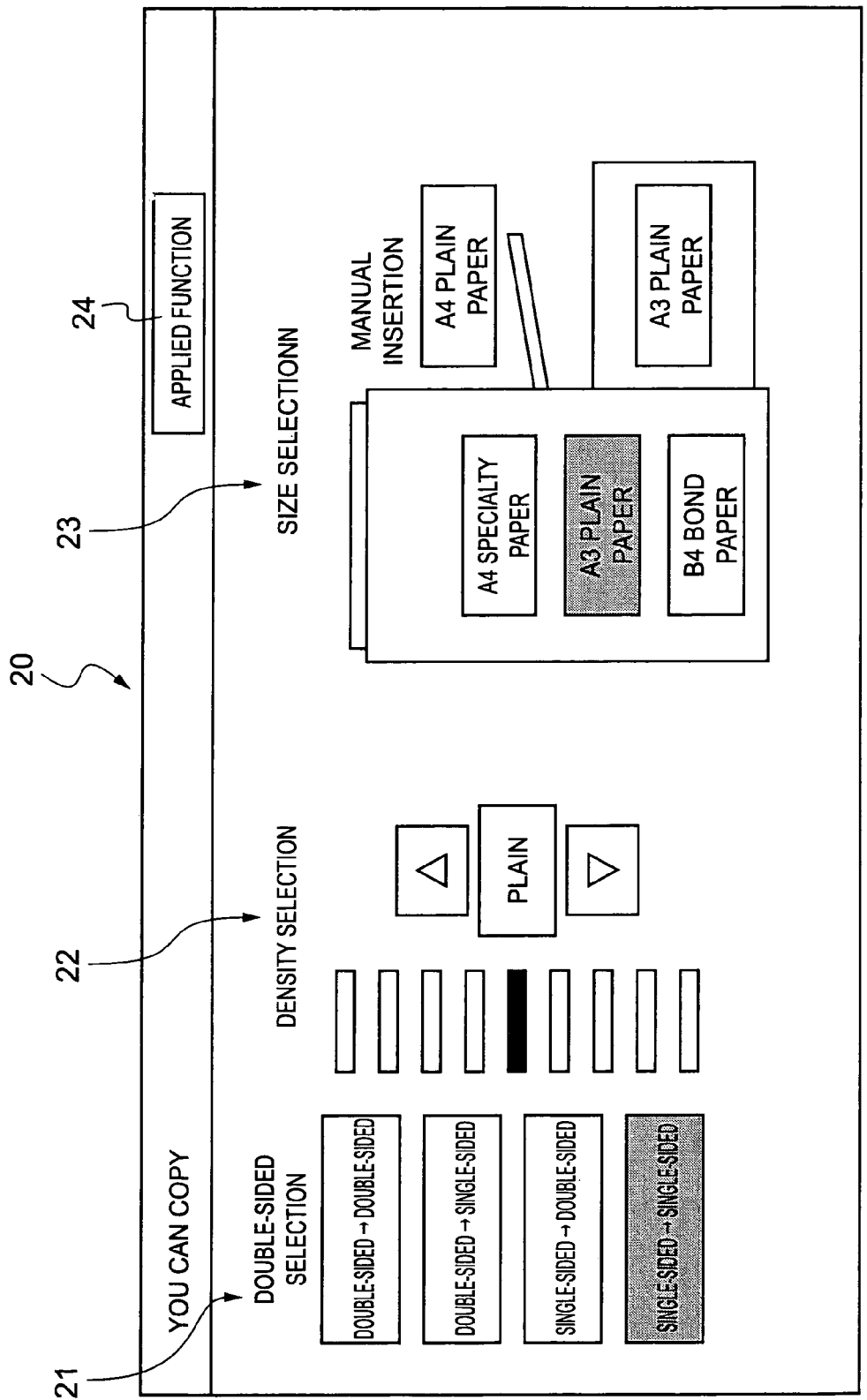
FIG. 4 is a view showing an example of an operation window in the digital copying machine shown in FIG. 1, and is a view showing the initial window which is displayed after user authentication and is operated by the user.

FIG. 4 is a view showing an example of the operation window in the digital copying machine 1 in FIG. 1. This window is the initial window which is displayed after user authentication and is to be operated by the user.

An operation window 20 is a touch panel input type operation window which corresponds to the input unit 16 and display unit 17 shown in FIG. 2. When the user touches a portion such as a predetermined button in this window, the control unit 12 of the digital copying machine 1 detects this.

As shown in FIG. 4, the operation window 20 is the initial window of the digital copying machine 1. This window has an image printing surface selection field 21 for designating how to use the surfaces of a copy source original and copy destination printing sheet, a density selection field 22 for selecting a density in image printing, a size selection field 23 for selecting a sheet in a specific paper tray as a copy destination printing sheet, and an applied function button 24 which is pressed by a user when he/she is to use the applied function of the digital copying machine 1.

Assume that as an example of the applied function of the digital copying machine 1, external image processing will be exemplified, in which image data is transferred from the digital copying machine 1 to the PC server 3, the PC server 3 performs image processing for the image data, and the resultant image data is returned to the digital copying machine 1 to print an image. Assume that in the following description, when the applied function button 24 is pressed, this external image processing is executed.

As image processing to be executed by an external device, i.e., the PC server 3, any type of conventionally known image processing can be targeted, including clean copy processing, cleaning processing, inclination correction processing, font conversion processing, and half-tone dot meshing processing.

It is not essential for this embodiment to perform image processing for image data in the PC server 3. For example, it suffices if image data is input to a digital copying machine through (or not through) the PC server 3 and a network, and the digital copying machine prints an image based on the image data.

When the image data having undergone image processing in the PC server 3 is to be returned to a digital copying machine to print an image, the data may not be returned to the digital copying machine 1 as a request source but may be returned to another digital copying machine, e.g., the digital copying machine 2 in FIG. 2. Likewise, the image data read by the digital copying machine 2 may be input to the digital copying machine 1 through the PC server 3.

When, for example, an original image is to be read by the digital copying machine 1 and a corresponding image is to be printed by the digital copying machine 1, output limitation and management are performed under the control of the EKC of the digital copying machine 1. Image data (to be also referred to as "write data" hereinafter because this is data for image printing, i.e., for a write on a sheet) returned from the digital copying machine 1 to the digital copying machine 1 through the PC server 3 is data that has been initially obtained by the user of the digital copying machine 1. It is therefore preferable that output limitation and management for such data be performed under the control of the EKC.

In the control by the EKC, user IDs and output limitations for the respective users are stored in advance in the storage unit 15 in correspondence with each other. Upon reception of an output request from a given user, the control unit 12 authenticates the user by collation with the user IDs stored in the storage unit 15 (user authentication unit), and reads out an output limitations for the user stored in the storage unit 15. The control unit 12 then performs output control on the basis of the limitation (user-specific output limitation setting unit).

As an example of the user-specific output limitation stored in the storage unit 15, one of the following is to be set:

permitting all output operations by the user;
adding a limit to output operation by the user (e.g., permitting 100 prints per month); and
inhibiting all output operations by the user.

When a limit is to be added, the user is allowed to set contents of the limit. It suffices if only a user at the administrator level is allowed to make this setting in the operation window of the digital copying machine 1, and the setting result is stored in the storage unit 15 in correspondence with the user ID.

When a limit is to be added, the control unit 12 of the digital copying machine 1 may count an output print count for each user, and stores the count in the storage unit 15. The control unit 12 then checks whether or not the output operation by the user has reached the limit. If the output has reached the limit, the control unit 12 may perform control to inhibit output operation.

In this manner, with respect to the image data returned from the digital copying machine 1 to the digital copying machine 1 through the PC server 3, the output limitation set by the EKC is applied to the user of the image data. However, the image data input from a copying machine different from the digital copying machine 1 to the digital copying machine 1 through the PC server 3 cannot be controlled and processed in the same manner as described above.

In this embodiment, therefore, the following operation is executed.

When a user presses the applied function button 24 in the operation window 20 shown in FIG. 4, the control unit 12 detects this and communicates with the PC server 3, which is registered as an image processing server in the storage unit 15 in advance, through the network connection unit 11 and network 4.

In this communication, the digital copying machine 1 encrypts, with its private key, an apparatus ID (stored in, for example, in the storage unit 15) which can specify the apparatus, e.g., its own manufacturer's serial number or its own IP address, and transmits the encrypted data to the PC server 3 under the control of the control unit 12. Note that encryption is not essential and may be performed as needed. In the subsequent communication as well, data may be encrypted as needed.

Upon receiving data from the digital copying machine 1 through the network connection unit 31, the control unit 32 of the PC server 3 can obtain the apparatus ID of the digital copying machine 1 by decrypting the received data with the public key of the digital copying machine 1. With this operation, the digital copying machine 1 is authenticated.

More specifically, the apparatus IDs of digital copying machines whose functions can be provided by the PC server 3 are registered in the storage unit 33 of the PC server 3 in advance, and the control unit 32 performs authentication by checking whether or not the apparatus ID obtained by decrypting the received data is registered in the storage unit 33.

If authentication is successful, the control unit 32 of the PC server 3 transmits the functions (a function list of a transfer function, image processing function, and the like) that can be provided for the authenticated copying machine (the digital copying machine 1 in this case) to the copying machine.

Upon receiving this data, the control unit 12 of the digital copying machine 1 acquires the function list from the PC server 3, and displays the functions that can be provided for the user in the operation window constituted by the input unit 16 and display unit 17 on the basis of this function list.

The user selects and inputs a desired function from the functions displayed in the operation window. Upon receiving this input, the control unit 12 performs operation in accordance with the function selected by the user. A case wherein the user has selected the transfer function will be described below.

Note that the transfer function in this embodiment is a function of transferring the image data read by the digital copying machine operated by the user to another digital copying machine through the PC server connected to the network, and making the digital copying machine at the transfer destination print an image based on the image data.

When the transfer function is selected in the operation window, the control unit 12 which has received the corresponding input displays a list of transfer destination digital copying machines in the operation window to prompt the user to select a transfer destination. The user may select the digital copying machine which he/she is currently operating as a transfer destination, or may select a plurality of transfer destinations.

When the user selects a transfer destination digital copying machine in the operation window, the control unit 12 detects it and switches the window to an operation window in which the user is to perform read operation for an original image. The user operates in the operation window to make the image reading unit 13 read an original image as image data.

This image data is processed as follows. In normal operation (copying operation without the use of the transfer function), the digital copying machine 1 performs, for example, luminance-density conversion of image data which is luminance data read by the image reading unit 13 under the control of the control unit 12. After various kinds of image processing are performed for the obtained density data as needed, the resultant image data is compressed and stored in the storage unit 15. Thereafter, the compressed image data is read out from the storage unit 15 and decompressed, and various kinds of image processing are performed for the decompressed image data as needed to create print data. The image printing unit 14 then prints an image based on the print data.

Assume that the transfer function is selected as the above applied function. In this case, image data which is luminance data read by the image reading unit 13 is directly compressed and stored in the storage unit 15 under the control of the control unit 12. This compressed image data is transmitted to the PC server 3, registered in advance as an image processing server in the storage unit 15, through the network connection unit 11 and network 4.

In this case, the control unit 12 of the digital copying machine 1 transmits its apparatus ID which can specify the apparatus, e.g., its own manufacturer's serial number or IP address, together with the image data, to the PC server 3 as in the above case of the authentication of the copying machine. In addition, the control unit 12 creates function information (the name of the function to be used and information necessary for the execution of the function (e.g., the address of the transfer destination selected by the user in the operation window)) of the function (the transfer function in this case) selected by the user in the operation window, the size information of the image data, current time information, the user information of the user as the operator of the current processing, and the like. The control unit 12 also transmits these pieces of information to the PC server 3. In this data transmission as well, transmission data may be encrypted as needed, and the encrypted data may be transmitted.

The control unit 32 of the PC server 3 receives these data and authenticates the transmission source copying machine associated with the current data as in the above case of the authentication of the copying machine. If the authentication is successful, image processing based on the received function information is performed for the received image data.

In this case, since the user has selected the transfer function, the address of the transfer destination copying machine is read out from the received function information, and the image data and data such as the apparatus ID of the request source are transferred to the address through the network connection unit 31 and network 4.

In this manner, the data (image data (i.e., write data) or the like) is transferred to the digital copying machine, and the digital copying machine which has received the data performs processing based on the data. This processing sill be described below.

Figure 5:
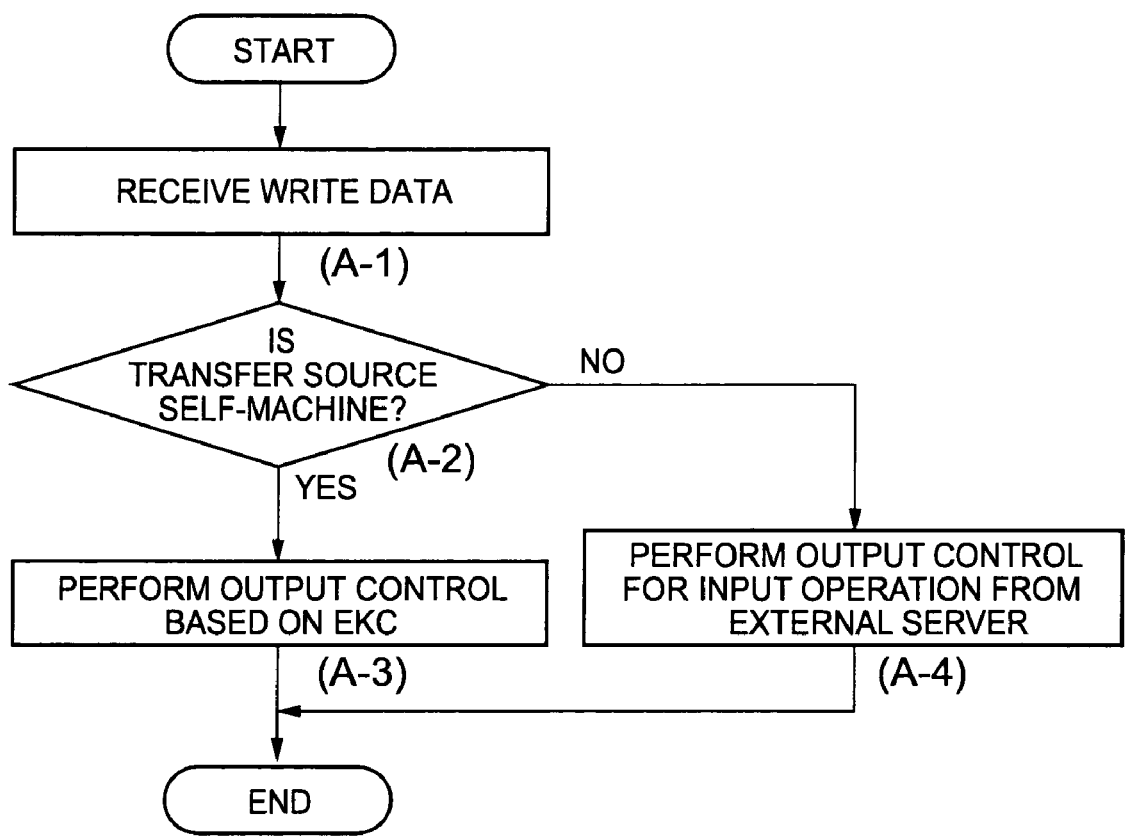
FIG. 5 is a flow chart showing an operation sequence in a digital copying machine which has received write data or the like from the PC server.

FIG. 5 is a flow chart showing an operation sequence for a digital copying machine which has received write data from the PC server 3.

Control operation to be performed by the control unit 12 when the digital copying machine 1 receives write data from the PC server 3 will be described below.

First of all, the control unit 12 of the digital copying machine 1 receives the write data through the network 4 and network connection unit 11 (A-1).

The control unit 12 reads out the apparatus ID of the request source contained in the received data, and checks whether or not the apparatus ID is equal to the apparatus ID of the digital copying machine 1 itself stored in advance in the storage unit 15. If they equal to each other, the control unit 12 determines that the original transfer source of the current write data relayed by the PC server 3 is the digital copying machine 1 itself. If these IDs are not equal, the control unit 12 determines that the transfer source is other than the digital copying machine 1 itself (A-2).

If it is determined in step (A-2) that the transfer source is the digital copying machine 1 itself, the above control operation by the EKC which is set for the user corresponding this write data is performed (A-3).

If it is determined in step (A-2) that the transfer source is other than the digital copying machine 1 itself, output control for input operation from a predetermined external server is performed (A-4). An example of output control for input operation from the external server will be described below.

For example, when the transfer source of received write data is other than the digital copying machine 1 itself, one of the following is set as an example of an output limitation:

permitting all output operations by apparatuses other than the digital copying machine 1;

adding a limit to output operation by an apparatus other than the digital copying machine 1 (e.g., permitting 100 prints per month); and inhibiting all output operations by apparatuses other than the digital copying machine 1.

When a limit is to be added, the user is allowed to set contents of the limit. A user at the administrator level is allowed to make this setting by using the operation window of the digital copying machine 1. This corresponds to the external data output limitation setting unit.

The contents of this setting are stored in the storage unit 15. In step (A-4), control is performed on the basis of this setting.

Note that if, in output control for input operation from this external server, an output is rejected, the control unit 12 preferably notifies the transfer source digital copying machine of the corresponding information. This notification may be performed by so-called e-mail, or may be performed by any kind of communication medium such as the ftp protocol or HTTP protocol. In the digital copying machine which has received the notification, the corresponding information is displayed on the self-display unit. This allows the user or administrator to know that the output has been rejected, and to take corresponding countermeasures afterward.

Output control for input operation from an external server can be set in the following manner. Each external server is regarded as one user, and an output control setting is made for each user under the control of the EKC. Likewise, an output limitation to be imposed when write data is received from an external server can be set in advance by using the EKC.

In this case, if a plurality of external servers are connected to a network, each of the external servers can be regarded as one user, and different settings can be made for the respective external servers by using the EKC.

According to another example of setting of output control for input operation from an external server, control can be performed by setting a limitation independently of the EKC. In this case, when a user at the administrator level is to set an output limitation or the like in the digital copying machine 1, he/she makes a setting in a dedicated setting window different from the setting window based on the EKC. Setting contents are stored in the storage unit 15 in advance as in the case of the EKC.

This makes it possible to perform control independently of the EKC. Even if, therefore, the EKC is made invalid, output control can be performed.

What is claimed is:

1. An image printing system formed by connecting, through a network, a plurality of image printing apparatuses, each having image reading means for reading an image from an original to obtain image data, image printing means for printing an image on a sheet on the basis of the image data, and first image processing means for performing image processing for the image data, and an information processing apparatus having second image processing means for performing image processing for the image data, wherein at least one of said image printing apparatuses further comprises apparatus ID storage means for storing an apparatus ID which specifies a self image printing apparatus that comprises said apparatus ID storage means, and first image data transmission means for transmitting, to said information processing apparatus, image data to be output, an apparatus ID stored in said apparatus ID storage means, and a transfer destination address which is an address of a remote image printing apparatus to which the image data is to be transferred, said information processing apparatus further comprises first image data reception means for receiving image data, an apparatus ID, and a transfer destination address from said first image data transmission means, and second image data transmission means for transmitting the image data received by said first image data reception means and the apparatus ID to the transfer destination address received by said first image data reception means, and the least one of said image printing apparatuses further comprises external data output limitation setting means for setting a limitation associated with image printing of image data which is transferred from an apparatus as a transfer source other than the self image printing apparatus, second image data reception means for receiving image data and an apparatus ID from said second image data transmission means in said information processing apparatus, and control means for determining whether or not the transfer source of said image data is the self image printing apparatus by confirming whether or not the apparatus ID received by said second image data reception means coincides with an apparatus ID which specifies the self image printing apparatus stored in said apparatus ID storage means, and when said transfer source of said image data is not the self image printing apparatus, causing said image printing means to print an image based on the image data received by said second image data reception means on the basis of a limitation set by said external data output limitation setting means.

2. A system according to claim 1, wherein said external data output limitation setting means can set at least two kinds of settings including "always permitting output operation" and "always inhibiting output operation".

3. A system according to claim 1, wherein said external data output limitation setting means comprises limit value setting means which can set at least "limit addition" and sets a limit value of the "limit addition", and said control means permits output operation until an output print count reaches the limit value set by said limit value setting means, and inhibits output operation when the output print count reaches the limit value.

4. A system according to claim any one of claim 1, wherein at least one of said image printing apparatuses further comprises user authentication means for authenticating a user as an operator and user-specific output limitation setting means for setting an output limitation for each user, said first image data transmission means also transmits, to said information processing apparatus, user information of a user who has operated output operation for image data transmitted by said first image data transmission means, said first image data reception means also receives the user information from said first image data transmission means, said second image data transmission means also transmits the user information received by said first image data reception means to the transfer destination address received by said first image data reception means, said second image data reception means receives the user information from said second image data transmission means, and said control means determines whether or not the apparatus ID received by said second image data reception means coincides with an apparatus ID stored in said apparatus ID storage means, and when the apparatus IDs coincide with each other, performs control to make said image printing means print an image based on the image data received by said second image data reception means on the basis of the limitation set by said user-specific output limitation setting means.

5. A system according to claim 4, wherein the control performed by said control means with respect to an output limitation when the apparatus ID received by said second image data reception means coincides with the apparatus ID stored in said apparatus ID storage means is the same as control that would be performed with respect to the output limitation if an image based on image data were to be printed in the at least one of said image printing apparatuses without the mediacy of said information processing means.

6. A system according to any one of claims 1 to 5, wherein when said control means rejects image printing based on the image data received by said second image data reception means, said control means notifies a user who has operated output operation for the image data of corresponding information.

7. A system according to any one of claims 1 to 5, wherein when said control means rejects image printing based on the image data received by said second image data reception means, said control means notifies an administrator of corresponding information.

8. A system according to claim 6, wherein said control means performs the notification by e-mail.

9. A system according to any one of claims 1 to 5, wherein when said control means rejects image printing based on the image data received by said second image data reception means, said control means notifies an image printing apparatus as a transmission source of the image data of corresponding information, and said image printing apparatus further comprises display means for displaying information indicating reception of the notification.

10. A system according to claim 2, wherein
said external data output limitation setting means comprises limit value setting means which can set at least "limit addition" and sets a limit value of the "limit addition", and
said control means permits output operation until an output print count reaches the limit value set by said limit value setting means, and inhibits output operation when the output print count reaches the limit value.

11. A system according to claim 2, wherein
at least one of said image printing apparatuses further comprises user authentication means for authenticating a user as an operator and user-specific output limitation setting means for setting an output limitation for each user,
said first image data transmission means also transmits, to said information processing apparatus, user information of a user who has operated output operation for image data transmitted by said first image data transmission means,
said first image data reception means also receives the user information from said first image data transmission means,
said second image data transmission means also transmits the user information received by said first image data reception means to the transfer destination address received by said first image data reception means,
said second image data reception means receives the user information from said second image data transmission means, and
said control means determines whether or not the apparatus ID received by said second image data reception means coincides with an apparatus ID stored in said apparatus ID storage means, and when the apparatus IDs coincide with each other, performs control to make said image printing means print an image based on the image data received by said second image data reception means on the basis of the limitation set by said user-specific output limitation setting means.

12. A system according to claim 3, wherein
at least one of said image printing apparatuses further comprises user authentication means for authenticating a user as an operator and user-specific output limitation setting means for setting an output limitation for each user,
said first image data transmission means also transmits, to said information processing apparatus, user information of a user who has operated output operation for image data transmitted by said first image data transmission means,
said first image data reception means also receives the user information from said first image data transmission means,
said second image data transmission means also transmits the user information received by said first image data reception means to the transfer destination address received by said first image data reception means,
said second image data reception means receives the user information from said second image data transmission means, and
said control means determines whether or not the apparatus ID received by said second image data reception means coincides with an apparatus ID stored in said apparatus ID storage means, and when the apparatus IDs coincide with each other, performs control to make said image printing means print an image based on the image data received by said second image data reception means on the basis of the limitation set by said user-specific output limitation setting means.

13. A system according to claim 6, wherein when said control means rejects image printing based on the image data received by said second image data reception means, said control means notifies an administrator of corresponding information.

14. A system according to claim 7, wherein said control means performs the notification by e-mail.

15. A system according to claim 7, wherein when said control means rejects image printing based on the image data received by said second image data reception means, said control means notifies an image printing apparatus as a transmission source of the image data of corresponding information, and said image printing apparatus further comprises display means for displaying information indicating reception of the notification.

16. A system according to claim 8, wherein when said control means rejects image printing based on the image data received by said second image data reception means, said control means notifies an image printing apparatus as a transmission source of the image data of corresponding information, and said image printing apparatus further comprises display means for displaying information indicating reception of the notification.

17. An image printing apparatus which has an image printing section for printing an image on a sheet on the basis of image data, and a first image processing section for performing image processing for the image data and which is connected, through a network, to an information processing apparatus having a second image processing section for performing image processing for the image data, wherein
said image printing apparatus further comprises
a storage section for storing an apparatus ID which specifies the image printing apparatus itself,
a data transmission section for transmitting, to said information processing apparatus, image data to be output, an apparatus ID stored in said storage section, and a transfer destination address which is an address of a remote image printing apparatus to which the image data is to be transferred,
a setting section for setting a limitation associated with image printing of image data which is transferred from an apparatus as a transfer source other than the image printing apparatus itself, a data reception section for receiving image data and an apparatus ID from said information processing apparatus, and a control section for determining whether or not the transfer source of said image data is the image printing apparatus itself by confirming whether or not the apparatus ID received by said data reception section coincides with an apparatus ID which specifies the image printing apparatus itself stored in said storage section, and when said transfer source of said image data is not the image printing apparatus itself, causing said image printing section to print an image based on the image data received by said data reception section on the basis of a limitation set by said setting section.

18. An image printing apparatus according to claim 17, wherein said setting section can set at least a setting "always inhibiting output operation".

19. An image printing apparatus according to claim 17, wherein said setting section can set an upper limit value of output print count of image printing, and said control section inhibits image printing based on said received image data, when the output print count of image printing based on said received image data reaches said upper limit value.

20. An image printing apparatus according to claim 17, wherein, when said control section rejects image printing based on the received image data, said control section notifies at least one of a user who has operated output operation for the image data, an administrator, and an image printing apparatus as a transfer source of the image data, of corresponding information.

* * * * *

UNITED STATES PATENT AND TRADEMARK OFFICE
CERTIFICATE OF CORRECTION

PATENT NO.        : 7,616,334 B2
APPLICATION NO.   : 10/801558
DATED             : November 10, 2009
INVENTOR(S)       : Tetsuya Niitsuma It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1517 days.

Signed and Sealed this

Nineteenth Day of October, 2010

David J. Kappos
*Director of the United States Patent and Trademark Office*